United States Patent [19]
Ball et al.

[11] Patent Number: 5,067,506
[45] Date of Patent: * Nov. 26, 1991

[54] FLIGHT CRAFT WITH FLUID SYSTEMS WHICH INCORPORATE BUTTERFLY VALVES, AND BUTTERFLY VALVE METHODS AND APPARATUS

[75] Inventors: Larry K. Ball, Chandler; Marshall U. Hines; John N. Tervo, both of Scottsdale, all of Ariz.

[73] Assignee: Allied-Signal Inc., Morris Township, Morris County, N.J.

[ * ] Notice: The portion of the term of this patent subsequent to Oct. 23, 2007 has been disclaimed.

[21] Appl. No.: 543,991

[22] Filed: Jun. 26, 1990

Related U.S. Application Data

[63] Continuation-in-part of Ser. No. 374,897, Jun. 30, 1989, and a continuation-in-part of Ser. No. 533,965, Jun. 6, 1990, and a continuation-in-part of Ser. No. 538,809, Jun. 15, 1990.

[51] Int. Cl.$^5$ .............................................. F16K 1/22
[52] U.S. Cl. .......................................... 137/1; 137/9; 137/487.5; 251/283; 251/305
[58] Field of Search ............................ 251/305, 283; 137/487.5, 1, 9

[56] References Cited

U.S. PATENT DOCUMENTS

| 212,556 | 2/1879 | Johnson . | |
|---|---|---|---|
| 443,326 | 12/1890 | Leverich . | |
| 965,322 | 7/1910 | Peterson . | |
| 1,167,145 | 1/1916 | Baverey . | |
| 1,328,565 | 1/1920 | Howard . | |
| 1,541,047 | 6/1925 | Hart . | |
| 1,744,798 | 1/1930 | Price . | |
| 2,051,881 | 8/1936 | Mock . | |
| 2,095,263 | 10/1937 | Moss . | |
| 2,271,390 | 1/1942 | Dodson . | |
| 2,509,295 | 5/1950 | Glass | 137/487.5 X |
| 2,662,547 | 12/1953 | Comeau | 137/487.5 X |
| 2,796,082 | 6/1957 | Green et al. . | |
| 2,833,511 | 5/1958 | Fletcher . | |
| 2,910,266 | 10/1959 | Condello et al. . | |
| 3,008,685 | 11/1961 | Rudden . | |
| 3,062,232 | 11/1962 | McGay . | |
| 3,065,950 | 11/1962 | Goldberg . | |
| 3,200,838 | 8/1965 | Scheaffer . | |
| 3,298,659 | 1/1967 | Cupedo . | |
| 3,344,808 | 10/1967 | Cary . | |
| 3,400,907 | 9/1968 | Horn et al. . | |
| 3,442,489 | 5/1969 | Cary et al. . | |
| 3,516,640 | 6/1970 | Bryer et al. . | |
| 3,545,486 | 12/1970 | Larson . | |
| 3,675,681 | 7/1972 | Obermaier . | |
| 3,677,297 | 7/1972 | Walton . | |

(List continued on next page.)

FOREIGN PATENT DOCUMENTS 2821766 11/1979 Fed. Rep. of Germany .
0320490A2 6/1989 Fed. Rep. of Germany .
1533073 11/1978 United Kingdom .

OTHER PUBLICATIONS

"Fishtail vs. Conventional Discs in Butterfly Valves", Carl D. Wilson, Instruments & Control Systems, vol. 41, undated.
"The Note on the Reduction of the Fluid Dynamic Torque of Butterfly Valves", D. W. Bryer/D. E. Walshe, National Physical Laboratory, undated.

Primary Examiner—Robert G. Nilson
Attorney, Agent, or Firm—Joseph R. Black; James W. McFarland; Robert A. Walsh

[57] ABSTRACT

A method for facilitating control of a butterfly valve, butterfly valves (40, 180) adapted for use with the method, and a fluid system (242) incorporating such valves are disclosed. All three use or incorporate butterfly valve structure that provides for relative translational movement (246) between the valve plate (42, 182, 248) and a pivot axis (232) in order to alter fluid dynamic torque exerted on the valve plate.

14 Claims, 9 Drawing Sheets

U.S. PATENT DOCUMENTS

| | | | |
|---|---|---|---|
| 3,757,808 | 9/1973 | Peterson | 137/487.5 X |
| 3,770,242 | 11/1973 | O'Connor | 251/305 |
| 3,794,288 | 2/1974 | Dolder et al. | |
| 3,960,177 | 6/1976 | Baumann | |
| 3,971,414 | 7/1976 | Illing | |
| 3,982,725 | 9/1976 | Clark | |
| 3,993,096 | 11/1976 | Wilson | |
| 4,084,617 | 4/1978 | Happe | |
| 4,108,127 | 4/1985 | Thurston | |
| 4,190,074 | 2/1980 | Mailliet et al. | |
| 4,313,592 | 2/1982 | Baas | |
| 4,367,861 | 1/1983 | Bray et al. | |
| 4,508,132 | 4/1985 | Mayfield, Jr. et al. | |
| 4,534,538 | 8/1985 | Buckley et al. | |
| 4,556,192 | 12/1985 | Ramisch | |
| 4,586,693 | 5/1986 | Tinner | |
| 4,706,706 | 11/1987 | Page et al. | |
| 4,712,768 | 12/1987 | Herr et al. | |
| 4,967,778 | 11/1990 | Ball | 137/1 |

FLIGHT CRAFT WITH FLUID SYSTEMS WHICH INCORPORATE BUTTERFLY VALVES, AND BUTTERFLY VALVE METHODS AND APPARATUS

This application is a continuation-in-part following three copending applications: Ser. No. 374,897, filed on June 30, 1989; Ser. No. 533,965 filed on June 6, 1990; and Ser. No. 538,809 filed on June 15, 1990.

That portion of the patent term subsequent to Oct. 23, 2007 is disclaimed.

Reference is made to the following copending and commonly-owned U.S. patent applications: Ser. No. 395,234 filed on Aug. 17, 1989, now U.S. Pat. No. 4,964,422; Ser. No. 422,354 filed on Oct. 16, 1989, now U.S. Pat. No. 4,967,778; Ser. No. 426,921 filed on Oct. 24, 1989 now U.S. Pat. No. 4,967,997; Ser. No. 534,091 filed on Jun. 6, 1990; Ser. No. 534,054 filed on Jun. 1990; Ser. No. 534,052 filed on Jun. 6, 1990 now U.S. Pat. No. 4,995,414; and Ser. No. 533,965 filed on Jun. 6, 1990. All relate to butterfly valves.

TECHNICAL FIELD

The present invention relates generally to fluid systems and more specifically to butterfly valves for use therein.

BACKGROUND OF THE INVENTION

Figure 12A:
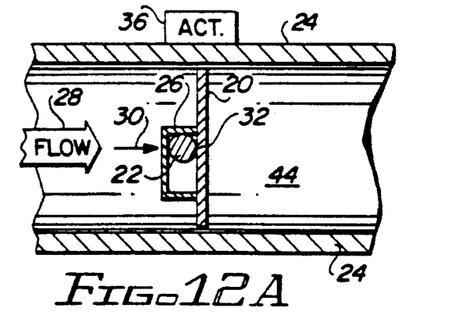
FIGS. 12A-12H are schematic illustrations of a butterfly valve in which the valve plate is translationally movable relative to the pivot mechanism, and shows various rotational and translational positions of the valve plate. These are provided for the purpose of illustrating the principles and use of a butterfly valve in accordance with the invention.
Figure 12B:
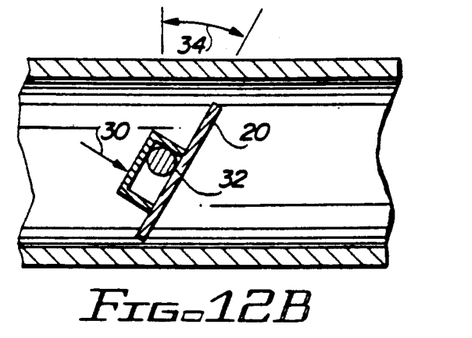
Figure 12C:
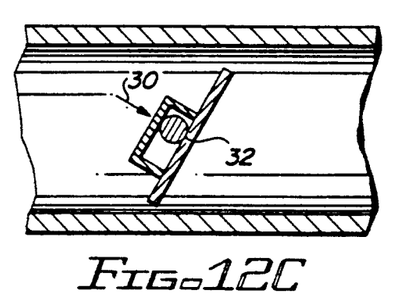
Figure 12D:
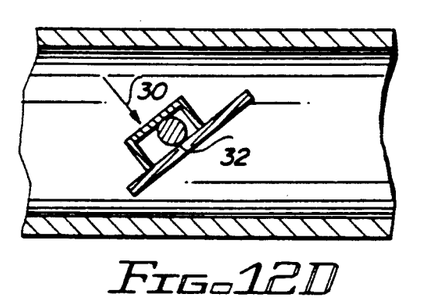

In butterfly valves, translational movement of the valve plate relative to the pivot mechanism can be used to effect dynamic torque balancing, and to facilitate actuation by using the torque exerted by fluid on the plate to rotate the latter. To applicants' knowledge, these principles were first set forth in the above-referenced patent application, Ser. No. 374,897, filed on June 30, 1989. They are schematically illustrated in FIGS. 12A-12C of the present application, wherein numerals 20, 22, 24, 26, and 28 indicate a valve plate, a pivot shaft, a duct, a bracket intersecuring the shaft and plate, and the direction of flow respectively. Arrow 30 and numeral 32 indicate the center of pressure associated with the forces exerted by fluid on the plate 20, and the pivot axis about which the plate is pivotable.

In FIG. 12A, the shaft 22 is centered in relation to the longitudinal dimension of the plate 20 and the plate is in a closed position. The center of pressure 30 is aligned with the pivot axis 32, so the net torque exerted by the fluid on the plate 20 is zero. If the plate 20 is rotated to an open position as illustrated in FIG. 12B, and translated relative to the shaft 22 so that the center of pressure 30 is aligned with the pivot axis 32 as illustrated in FIG. 12C, then the plate is effectively torque-balanced and the flow rate associated with the rotational angle 34 can be maintained with minimal input force required from the actuator 36. If the translational movement is too limited in range to achieve torque balancing at all rotational positions of the plate 20, it can still be used to advantage in minimizing the net torque exerted by the fluid, thus still minimizing the input force required from the actuator 36.

If it is desired to change the rotational angle 34, then the plate 20 can be translated relative to the shaft 22 in the appropriate direction to effect a misalignment of the center of pressure 30 with the pivot axis 32, thus increasing the net fluid dynamic torque, and the force required to effect the change is exerted in whole or in part by the fluid conveyed in the duct 24.

Butterfly valves such as those described above can be beneficially used in a variety of applications such as aircraft, spacecraft or space stations, oil pipelines, and process pipelines generally, to name a few. The primary benefit to be derived in a specific application may differ from that to be derived in another, although all such benefits are attributable to the reduction of fluid dynamic torque. For example, reductions in weight, volume, and/or energy usage (all resulting from the use of smaller actuators) may be the primary benefits associated with aerospace vehicles, whereas a reduction in valve failures attributable to high torque loads may be a primary benefit associated with process pipelines.

SUMMARY OF THE INVENTION

The invention provides a method for facilitating control of butterfly valves, and butterfly valves adapted for use with the method. The method comprises the step of altering the net torque exerted by a conveyed fluid on the valve plate of a butterfly valve by effecting relative translational movement between the valve plate and a pivot axis about which the valve plate is pivotable. This movement effects an increase in the surface area of the valve plate which is disposed on one side of the pivot axis, and a decrease in the surface area disposed on the opposite side of the pivot axis. The advantages associated with such movement have been generally described in the above section entitled BACKGROUND OF THE INVENTION. Butterfly valves adapted for use with the method are more particularly described and claimed hereinafter.

The invention further provides a fluid system installed aboard a flight craft and incorporating at least one such butterfly valve, the fluid system comprising a source of pressurized fluid, a duct forming a flow path extending from the source to a location of use, and a butterfly valve adapted to provide for the above-described translational movement. Typically, the fluid system further comprises an actuator operably connected to the butterfly valve to control the latter in response to command signals received from an electronic control system, and at least one sensor positioned downstream from the butterfly valve to supply sensor data to the control system, the data being indicative of a physical characteristic (e.g. flow rate, pressure, temperature) of the fluid.

BRIEF DESCRIPTION OF THE DRAWINGS

FIG. 10 is a partial, cross-sectional and partially elevational view of the butterfly valve illustrated in FIG.

1, as viewed in a direction parallel to both the valve plate and the pivot mechanism.

DESCRIPTION OF THE PREFERRED EMBODIMENT

Figure 1:
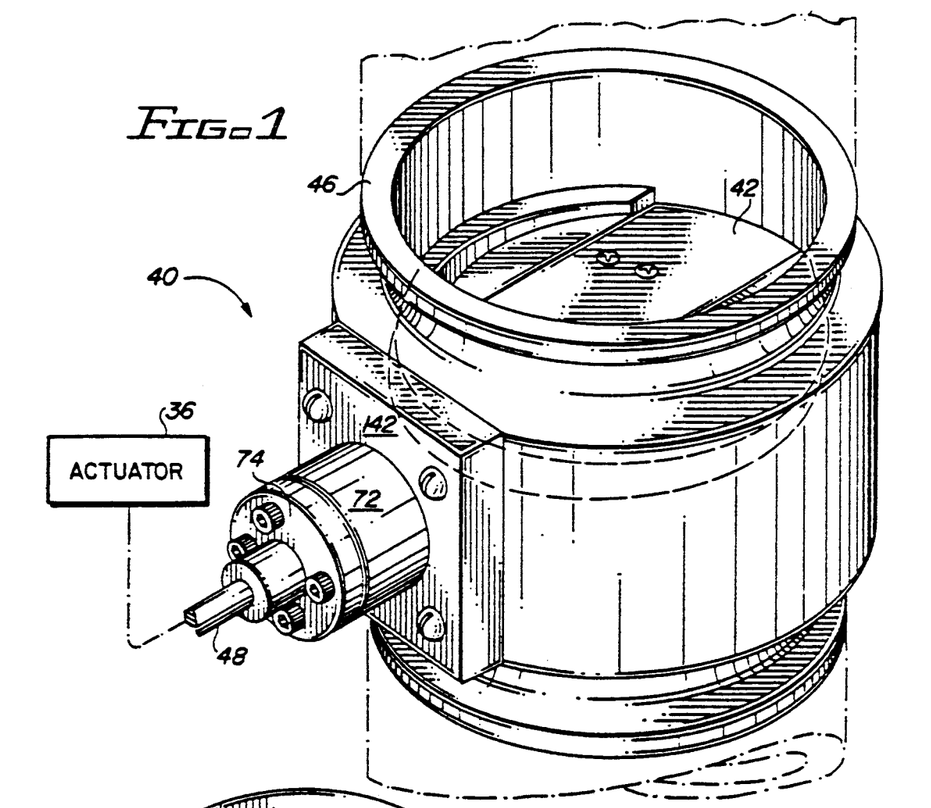
FIG. 1 is a perspective view of an assembled butterfly valve. Actuation of the valve is diagrammatically represented.

FIG. 1 of the accompanying drawings illustrates a butterfly valve 40 which is operable via an external actuator 36 to control the position of a valve plate 42. The valve plate 42 is pivotally disposed in and transects a flow path 44 (FIG. 10) defined by a mounting body 46.

In use, duct members (not shown) are secured to the mounting body 46 to define an elongate flow path along which a fluid is conveyed from a source thereof, through the valve 40, and to one or more points of use. Fluid flow is controlled by rotationally positioning the valve plate 42. The positioning is achieved in response to torque applied by the actuator 36 to an input shaft 48. This torque is transmitted through a differential gear 50 (FIG. 3, hereinafter "differential") to a pivot mechanism 52 (FIG. 7) which pivotally supports the valve plate 42 and is journalled in the mounting body 46.

Figures 8, 9:
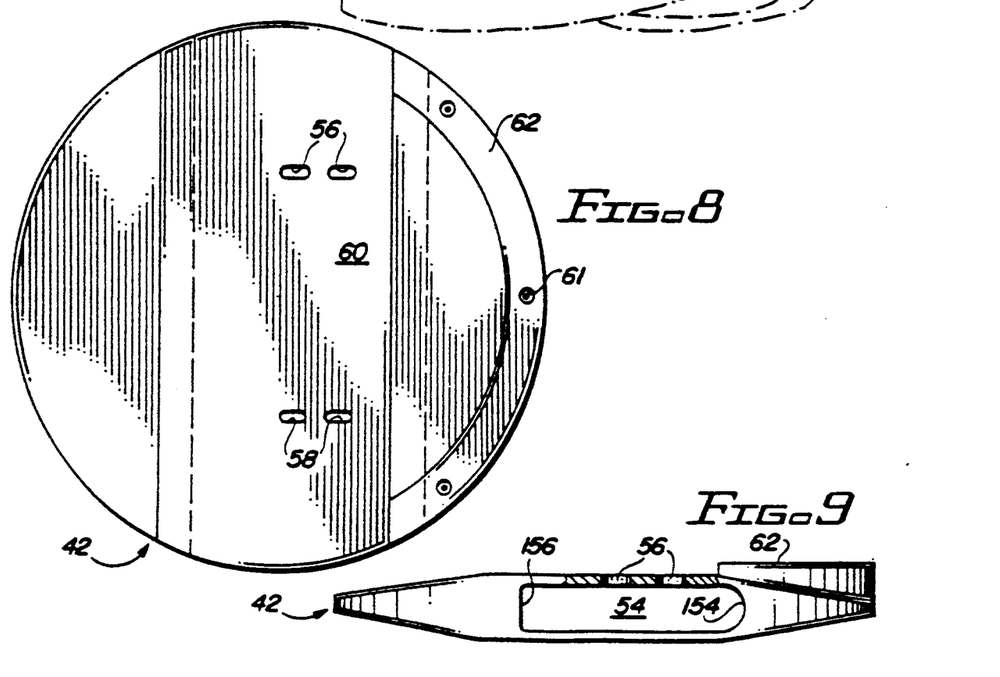
FIG. 8 is a top elevation of the valve plate illustrated in FIGS. 1 and 2.
FIG. 9 is a side elevation, in partial cross-section, of the valve plate illustrated in FIG. 8.

FIGS. 8 and 9 illustrate the valve plate 42 in more detail. The diameter of the circular valve plate 42 is slightly less than the inside diameter of the mounting body 46 in order to accommodate translational movement of the plate in the flow path 44. Translational movement of the valve plate 42 relative to the pivot mechanism 52 (FIG. 7) is accommodated by a suitably dimensioned cavity 54 extending through the plate as indicated. Slots 56, 58 are formed between the downstream-facing surface 60 of the plate and the cavity 54. Small tapped bores (not shown) extending into the plate receive screws 61 that secure an arcuate fence 62 to the plate near the leading edge of the latter. The slots 56, 58 are provided for securement of a pair of rack gears 64, 66 (FIG. 2) to the plate 42.

Figure 2:
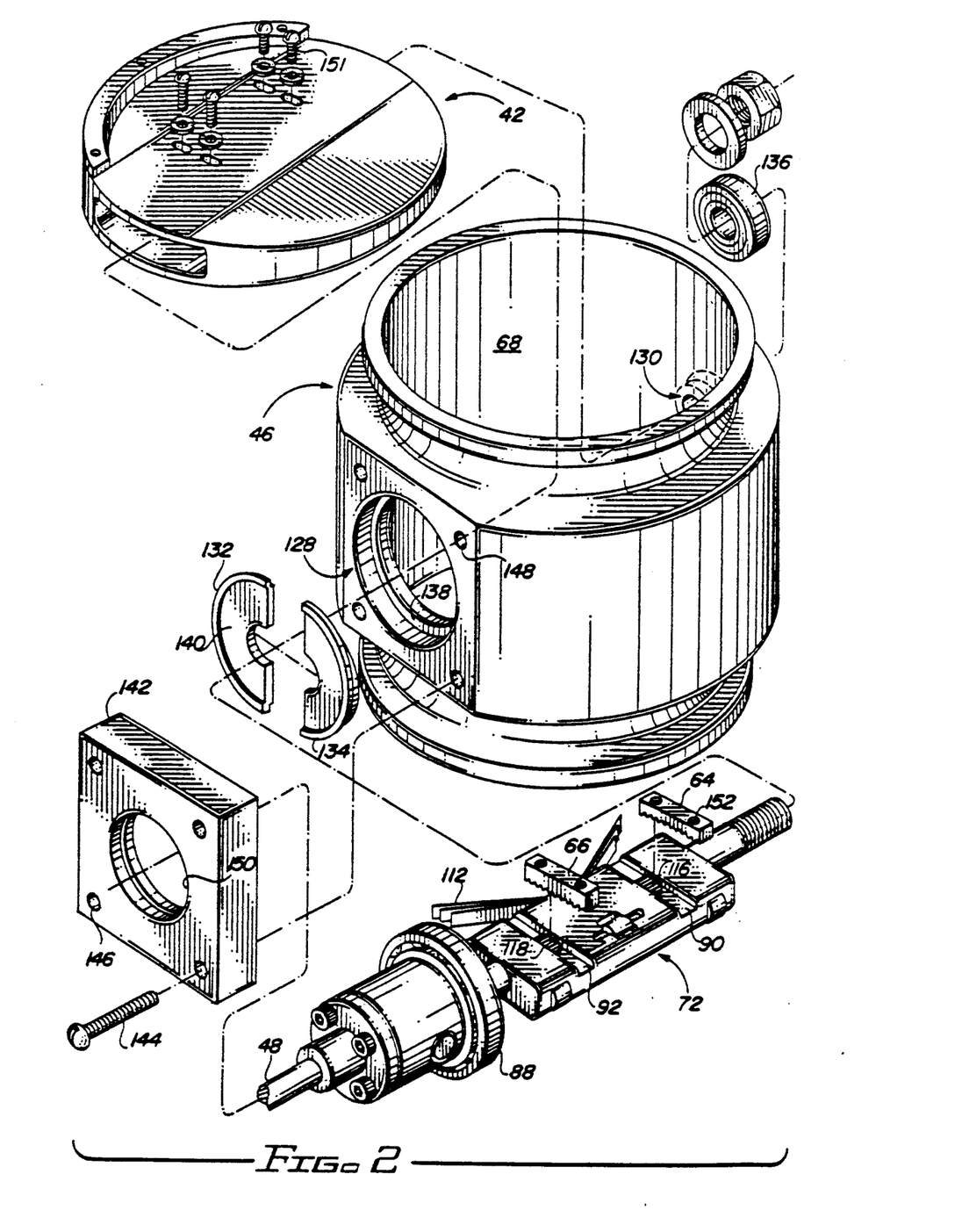
FIG. 2 is an exploded perspective view of the butterfly valve illustrated in FIG. 1.
Figures 3, 4, 5, 6, 7:
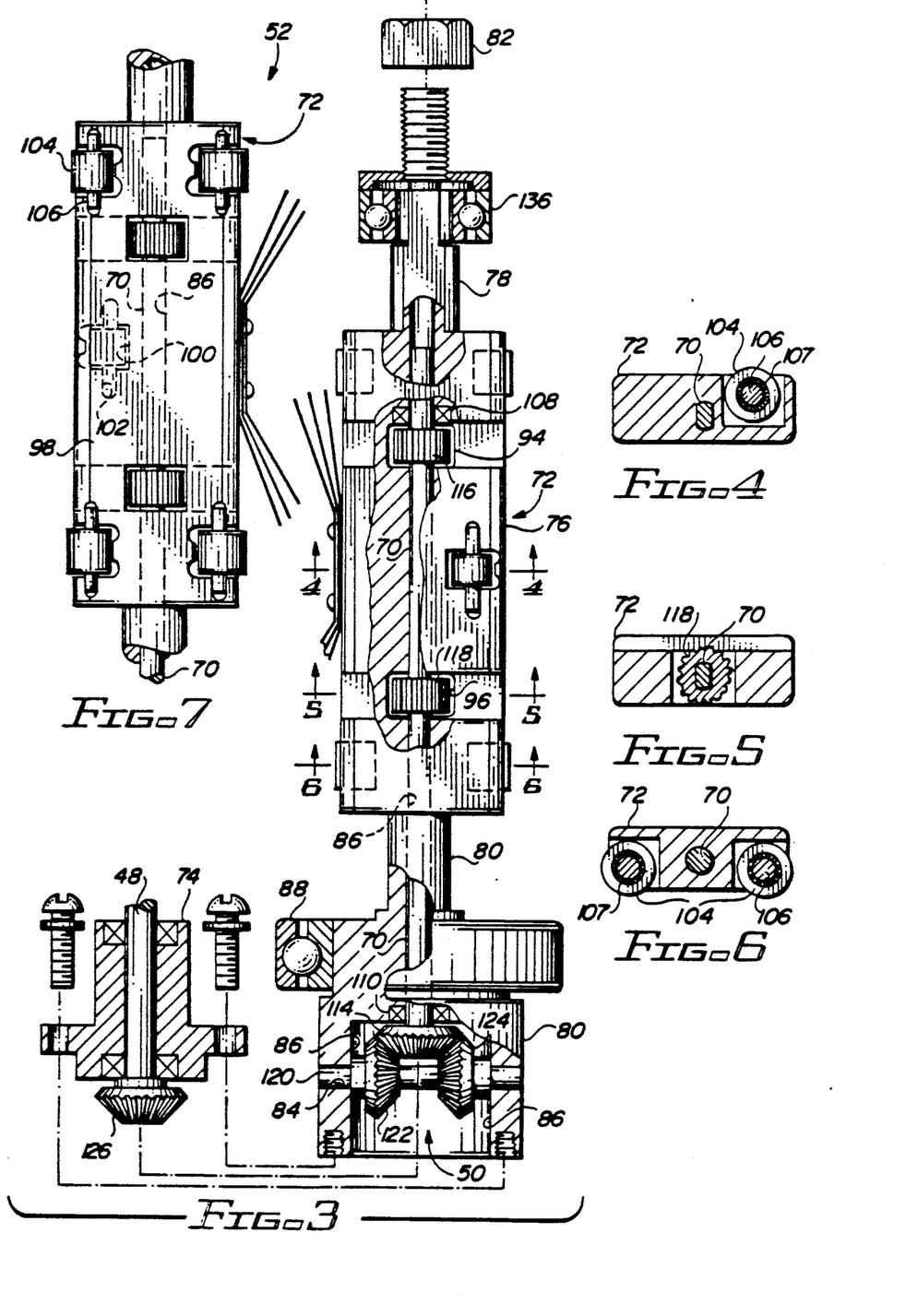
FIG. 3 is a partially elevational, partially cross-sectional, and partially exploded view of various components illustrated in FIG. 2, including a pivot mechanism and a differential gear.
FIGS. 4-6 are cross-sectional views taken along the lines indicated in FIG. 3.
FIG. 7 is an elevational and truncated view of the pivot mechanism illustrated in FIG. 3.

FIGS. 2, 3, and 7 illustrate the pivot mechanism 52 and differential 50 in detail. The pivot mechanism 52 comprises a center shaft 70 and a carrier shaft 72 (hereinafter, "carrier"). The carrier 72 has a centrally-disposed oblong portion 76 and two cylindrical end portions 78, 80. One end portion 78 is threaded for engagement with a nut 82, and the other end portion 80 has a transversely-extending bore 84 formed therethrough. A longitudinally-extending stepped bore 86 is formed in the carrier 72 to accommodate receipt of the center shaft 70 and to provide a housing for the differential 50. The bore 86 is sufficiently large in diameter to permit rotation of the center shaft 70 therein. Transverse slots 90, 92 are milled in the central portion 76, and through-slots 94, 96 are formed from the transverse slots to the upstream-facing surface 98 of the carrier. The through-slots 94, 96 intersect the longitudinally extending bore 86 as indicated. Five deep recesses (as at 100) and associated cross-slots (as at 102) are milled in the carrier 72 for installation of five rollers (as at 104) Each roller 104 is rotatably secured to a small shaft (as at 106) via needle bearings 107 (FIG. 6). The shaft 106 is force-fitted in the cross-slot 102. The rollers 104 function as bearings to minimize friction between the carrier 72 and the valve plate 42 during translational movement 109 (FIG. 10) of the latter. The longitudinally-extending bore 86 is enlarged at two locations and bearings 108, 110 are inserted. A bearing 88 is also pressed onto the cylindrical portion 80 as shown. A leaf spring 112 is rigidly secured to the edge of the carrier 72 via screws extending into tapped bores. (Note: Although the illustrated prototype incorporates the leaf spring 112, it is believed that a more robust biasing mechanism is preferable for most applications. Accordingly, the leaf spring 112 can be replaced by two suitably mounted and positioned coil springs, or such other functionally equivalent biasing means as are required in a given application).

A first bevel gear 114 of the differential 50 is pressed onto the center shaft 70 near the indicated end which extends into the differential housing. The center shaft 70 is received in the longitudinally-extending bore 86 and extends through the bearings 108, 110, and through two pinion gears 116, 118 positioned in the through-slots 94, 96 as illustrated.

A cross-shaft 120 is pressed through the cross-bore 84 and through needle bearings (not shown) received in the axial bores (not shown) of second and third bevel gears 122, 124. The fourth bevel gear 126 of the differential 50 is pressed onto the input shaft 48. The input shaft 48 extends through a stepped axial bore in an end cap 74 and is pressed through bearings seated in the latter. The end cap 74 is then secured to the end of the carrier 72 as indicated, with the fourth bevel gear 126 engaging the second and third 122, 124, and the latter two engaging the first 114 to form the differential 50.

It will be understood that the first and fourth bevel gears 114, 126 are rigidly secured to the center shaft 70 and input shaft 48, respectively, whereas the second and third bevel gears 122, 124 are rotatably secured to the cross-shaft 120. When rotational torque is applied to the input shaft 48, it is transmitted through the differential 50 to the center shaft 70. If the center shaft 70 is free to rotate, then it will do so in response to rotation of the input shaft 48. However, if the center shaft 70 is constrained from rotating, then the torque is transmitted to the carrier 72 via the cross-shaft 120.

The rack gears 64, 66 are positioned in the transverse slots 90, 92 and in engagement with the pinion gears 116, 118. The valve plate 42 is held inside the mounting body 46 and the leaf spring 112 is depressed as the pivot mechanism 52 is extended through an access port 128 and the cavity 54 (FIG. 9) until the threaded end portion 78 projects through on opposite port 130 formed through the mounting body.

Two semi-annular baffles 132, 134 are positioned around the carrier 72 between the bearing 88 and the central portion 76, and against an annular rim or boss 138 of the mounting body 46. The inside-facing surfaces (those not visible in FIG. 2) of the baffles 132, 134 are contoured to conform with the inner surface 68 of the mounting body 46, and the surfaces are flush when the baffles are positioned as described.

The pivot mechanism 52 is further extended through the cavity 54 until the bearing 88 abuts an annular land 140 defined by the baffles 132, 134. A cover plate 142 abuts the opposite side of the bearing 88 and is secured to the mounting body 46 via screws (as at 144) extending through bores (as at 146) and into tapped bores (as at 148). The cover plate 142 circumferentially surrounds the end portion 80 and the latter, along with the input shaft 48, projects through a central bore 150 in the cover plate.

The rack gears 64, 66 are rigidly secured to the valve plate 42 via screws (as at 151) extending through the slots 56, 58 (FIG. 8) and into tapped bores (as at 152) formed in the rack gears. A bearing 136 is pressed into the port 130 between the cylindrical portion 78 and the mounting body 46, and the pivot mechanism 52 is finally secured by tightly engaging the nut 82 with the threaded end portion 78.

When the valve 40 is assembled, the center shaft 70 is centered in relation to the valve plate 42 so that, in use, the net fluid dynamic torque is substantially zero when the plate is in the closed position. The leaf spring 112 is preloaded and abuts one transversely-extending, inside surface 154 (FIG. 9) of the valve plate 42, while the rollers 104 on the other end of the carrier 72 abut the opposite transversely-extending, inside surface 156.

Figure 10:
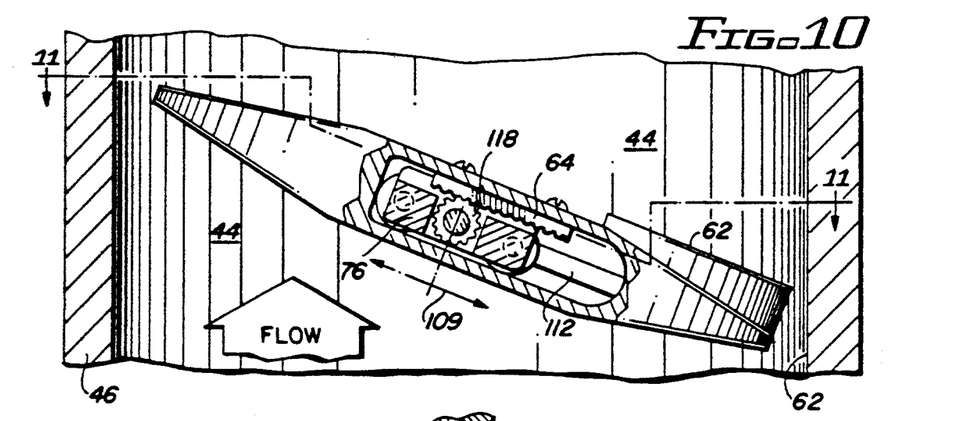
Figure 11:
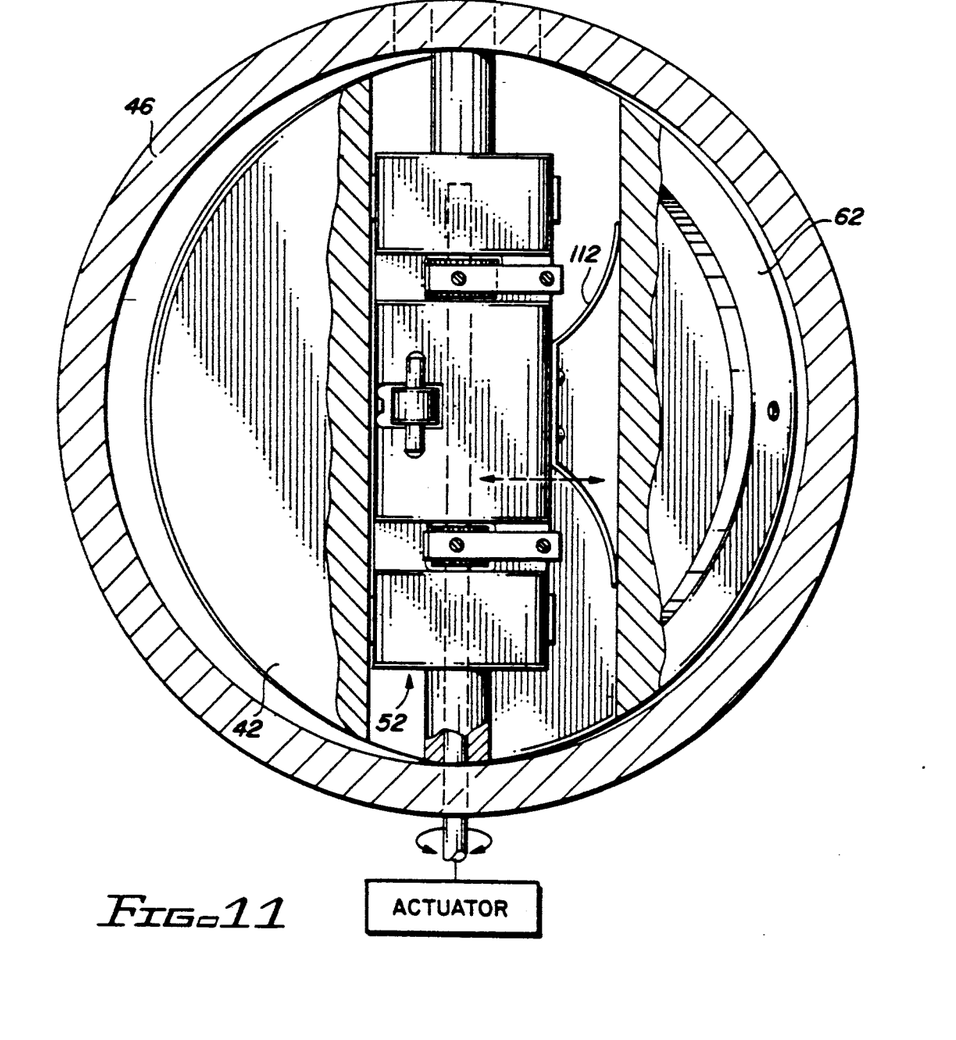
FIG. 11 is an elevational and partially fragmented view taken along lines 11—11 of FIG. 10.

When the input shaft 48 is rotated, the rotational torque is transferred to the center shaft 70 and the normal response, in the absence of the leaf spring 112, is rotation of the center shaft 70. Rotation of the center shaft 70 is accompanied by translational movement 109 of the valve plate 42 relative to the carrier 72 via coaction of the rack and pinion gears 64, 66, 116, 118. If the translational movement is impeded sufficiently to prevent rotation of the center shaft 70, then the response to rotation of the input shaft 48 is rotation of the carrier 72 and, consequently, rotation of the valve plate 42. Since the oblong portion 76 of the carrier 72 is generally conformal with the cavity 54 (allowing, however, for translational movement and the provision of rollers 104), the valve plate 42 and carrier coact to rotate together when either is rotated; and since the cylindrical end portion 80 of the carrier extends outwardly from the flow path 44 and through the mounting body 46, the rotational position of the valve plate is easily ascertainable from the exterior of the mounting body by reference to the rotational position of the carrier.

Impedance of translational movement can occur without use of the leaf spring 112 when the valve plate 42 is in the closed position, since the plate is then forced edgewise against the inside surface 68 of the mounting body 46. However, such an arrangement requires considerably higher initial opening torque since the impedance is accompanied by frictional forces between the mounting body 46 and valve plate 42. Accordingly, the illustrated valve 40 incorporates a biasing mechanism so that rotational movement is the normal response when the valve plate 42 is moved from the closed position. In open rotational positions, the valve plate 42 moves rotationally in response to rotation of the input shaft 48 so long as impedance to rotational movement—the impedance resulting from net fluid dynamic torque—is insufficient to overcome the impedance to translational movement that results from the spring force. When the impedance to rotational movement is sufficiently high, (i.e. when the center of pressure 30 is sufficiently misaligned with the pivot axis 32 as illustrated in FIGS. 12, the pivot axis of the illustrated valve 40 being the longitudinal axis of the carrier 72), then the valve plate 42 moves translationally to decrease the net torque until the impedance is again insufficient to overcome that resulting from the spring force.

Figure 13:
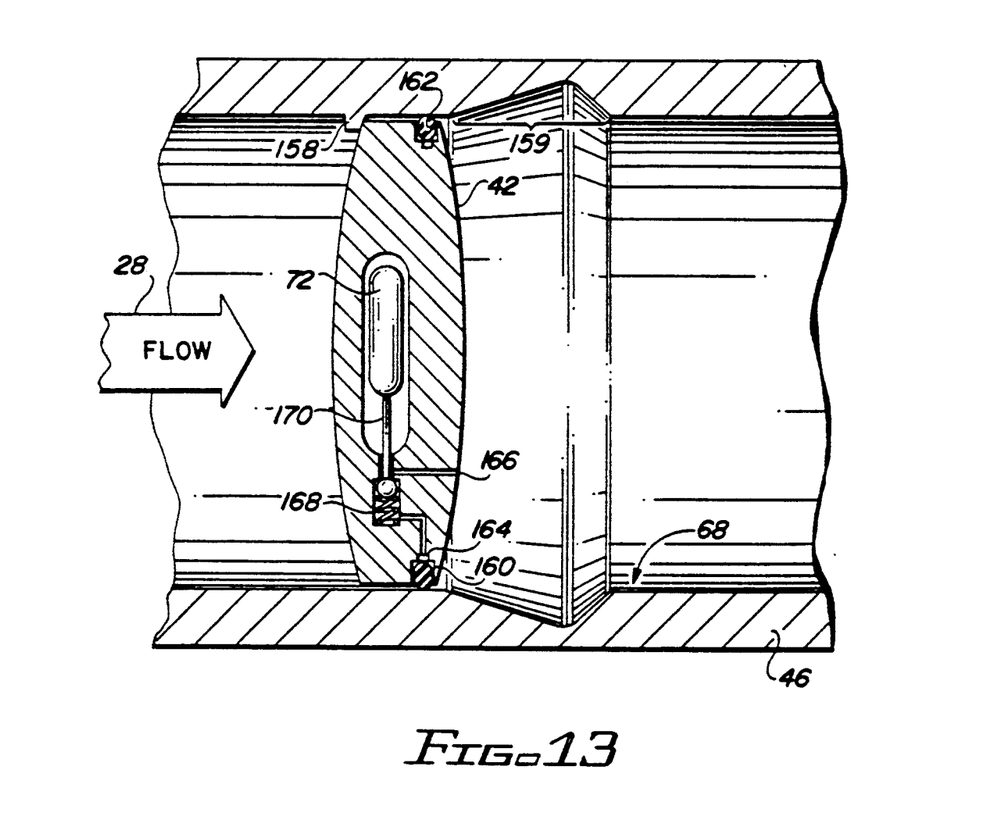
FIG. 13 is a schematic illustration wherein the butterfly valve of FIG. 1 incorporates a contemplated sealing arrangement in an application demanding a sealing function.

In applications which demand sealing in the closed rotational position, a conventional rim seal can be provided around the circumferential periphery of the valve plate 42. This may limit translational movement too much, which in turn may require suitable shaping of the inside surface 68 of the mounting body 46 in order to accommodate the required movement. Alternatively, a suitably shaped inside surface 46 in combination with face seals may be workable. FIG. 13 illustrates a contemplated arrangement in which fluid communication is sealingly closed with the valve plate 42 at a rotational angle of approximately zero. The mounting body 46 is adapted to provide a suitable stop 158 in order to prevent undesired rotational movement of the valve plate 42. To accommodate translational movement, the inside surface 68 of the mounting body 46 is radially extended over a range 159 immediately downstream from an annular recess 160 formed in the circumferential edge of the valve plate 42. The recess 160 is offset from the carrier 72 to provide circumferentially continuous sealing. A seal 162 is seated in the recess 160 and abuts the inside surface 68. A potential difficulty in butterfly valves which employ rim seals in high-pressure-ratio applications is that the high-pressure fluid on the upstream side of the valve plate 42 gets between the recess 160 and the seal 162. The fluid exerts radially outward force on the seal 162, which puts the seal in more aggressive contact with the inside surface 68. While that effect may be desirable for sealing purposes, it has the undesirable consequence of increasing the torque required to initially open the valve. Accordingly, in the FIG. 13 arrangement the valve plate 42 is adapted to provide one-way fluid communication from the recess 160 to the downstream side of the plate in order to relieve the forementioned outward pressure exerted on the seal 162. This is accomplished by forming an inner annulus 164 which fluidically connects the recess 160 to a flow passage 166. The passage 166 extends from the annulus 164 to the downstream-facing surface of the valve plate 42, and is blocked by a check valve 168. A push rod 170 is rigidly secured to the carrier 72 and is in contact with the check valve 168 so that a very slight translational movement of the valve plate 42 results in opening the check valve. In the closed position illustrated, the seal 162 impedes rotational movement of the valve plate 42 to a greater degree than the spring 112 (FIG. 2) impedes translational movement. Accordingly, when the valve plate 42 is sealingly closed as shown, rotation of the input shaft 48 (FIG. 2) results in rotation of the center shaft 70, and the valve plate is translated very slightly relative to the carrier 72. This slight translational movement opens the check valve 168, thus relieving the radially outward pressure exerted on the seal 162 and decreasing impedance to rotational movement of the valve plate 42. Use of the check valve 168 for both biasing (i.e. as an equivalent to the leaf spring 112 of FIG. 2) and seal-venting purposes is a possibility that has not been fully explored.

Figure 12E:
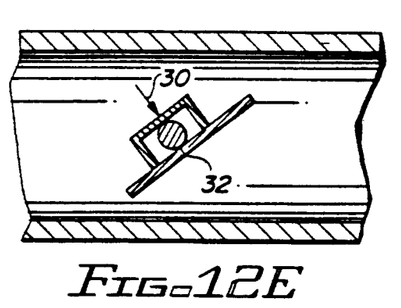
Figure 12F:
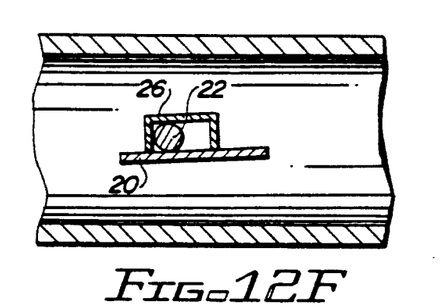

Use of the valve 40 will be described with reference to FIGS. 12A-12F. The valve plate 20, which is initially at a first rotational position (FIG. 12A) maximally closing fluid communication along the flow path 44, is rotationally moved away from the first position toward a second rotational position (FIG. 12F) maximally permitting fluid communication. The valve plate 20 is subjected to a net torque exerted by the fluid conveyed along the path 44 and the net torque increases with the rotational movement as the center of pressure 30 moves below the pivot axis 32, this being illustrated in FIG. 12B The valve plate 20 is translationally moved relative to the pivot shaft 22 so that the center of pressure 30 is more closely aligned with the pivot axis 32, thus decreasing the net torque, as illustrated in FIG. 12C. Continued rotational movement toward the second position (FIG. 12F), facilitated by the translational movement, is effected with a concomitant increase in the net torque as the center of pressure 30 again moves relative to the pivot axis 32, this being illustrated in FIG. 12D. Continued translational movement again more closely aligns the center of pressure 30 with the pivot axis 32 so that further rotational movement toward the second position (FIG. 12F) is facilitated, as indicated in FIG. 12E.

Rotational movement of the valve plate 20 continues until the plate reaches a desired rotational position (as in FIG. 12E) associated with a desired flow rate. The translational movement facilitates the rotational movement and, since the net torque exerted by the fluid on the plate is minimized via the translational movement, minimizes the load on the actuator 36 at the desired rotational position.

The overall movement of the valve plate is characterized by both rotational and translational components, although it may be substantially continuous between one rotational position and another. Thus, the progression indicated by FIGS. 12A-12E exaggerates the discreteness of successive translational or rotational components of movement, to the end of providing an easily understood illustration of the overall movement.

Figure 12G:
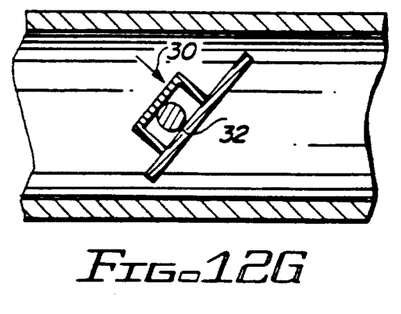
Figure 12H:
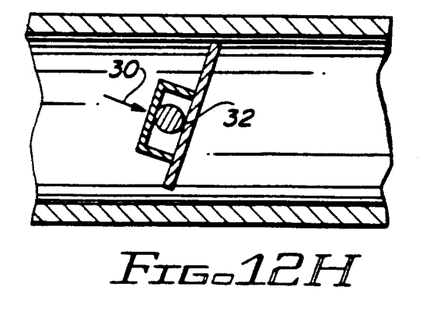

FIGS. 12G and 12H illustrate the movement in reverse. That is, starting from a rotational position such as that illustrated in FIG. 12E where the valve plate 20 is substantially torque-balanced, the plate is rotationally moved toward the first position (FIG. 12A), thus effecting a greater degree of misalignment between the center of pressure 30 and the pivot axis 32, as illustrated in FIG. 12G. The valve plate 20 is also translationally moved as illustrated in FIG. 12H to effect a lesser degree of misalignment, thus facilitating further rotational movement toward the first position.

Figure 14:
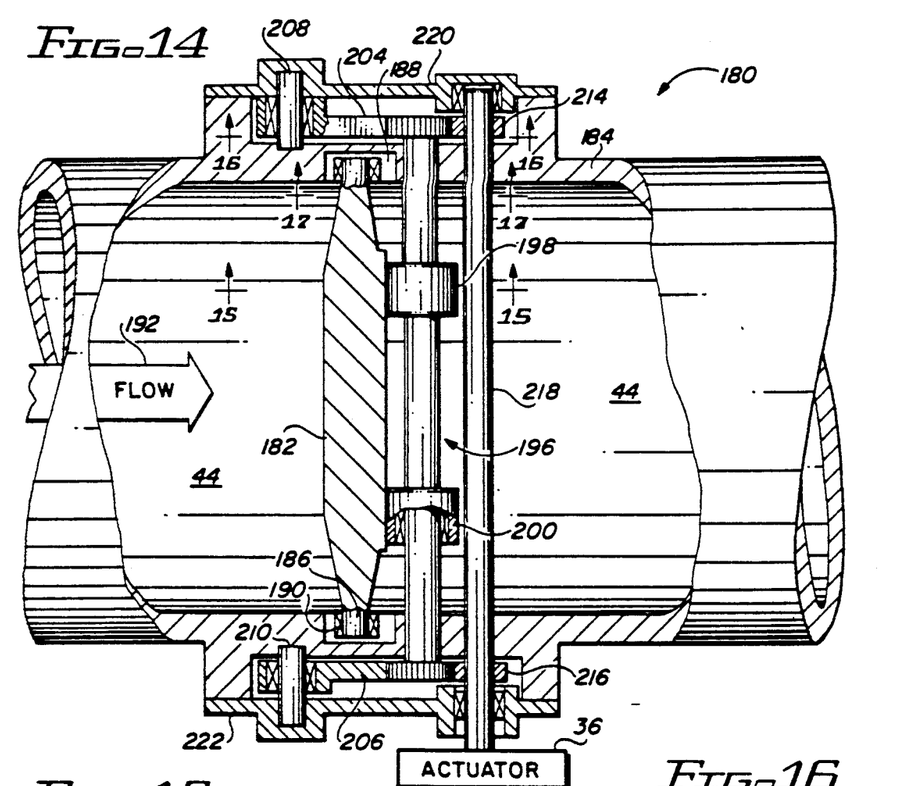
FIG. 14 is a partially fragmentary, cross-sectional view of another butterfly valve adapted for use with the invention. Actuation of the valve is diagrammatically represented.
Figure 18:
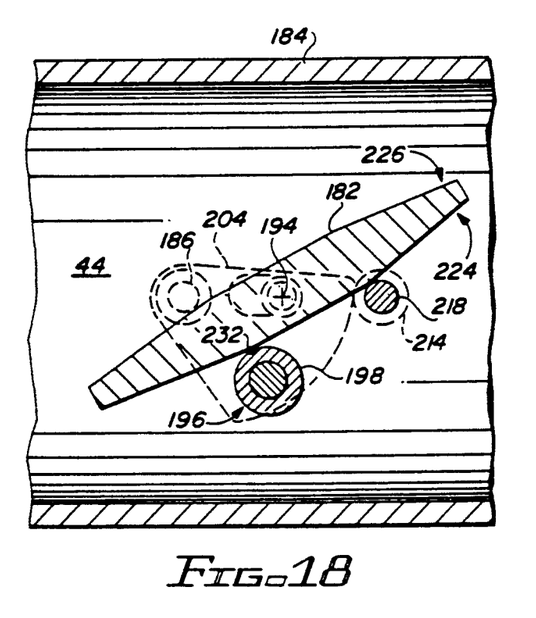
FIG. 18 corresponds in kind to FIG. 15 and shows the valve plate at a fully-open rotational position.
Figure 19:
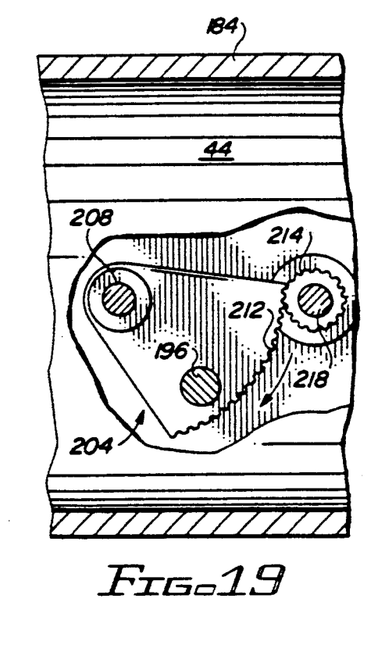
FIG. 19 corresponds in kind to FIG. 16 with the valve plate in the rotational position indicated in FIG. 18.
Figure 20:
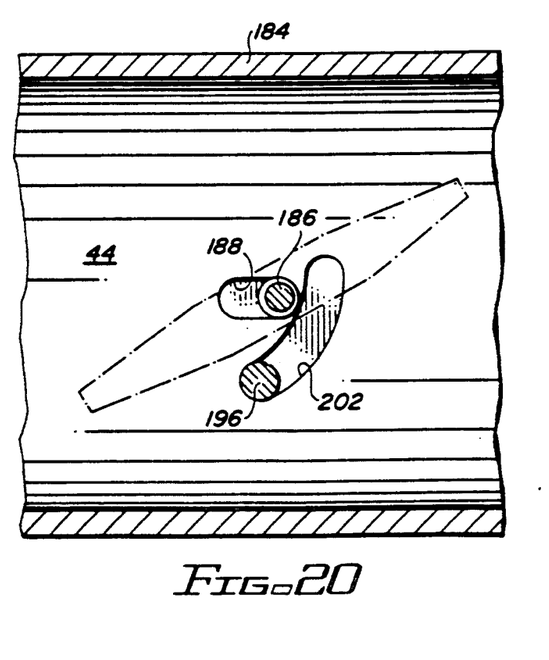
FIG. 20 corresponds in kind to FIG. 17 with the valve plate in the rotational position indicated in FIG. 18.

FIG. 14 illustrates another valve 180 suitable for use with the invention, in which the pivot mechanism is the translationally movable element and is provided in the form of a shaft incorporating roller bearings. The valve plate 182 transects an elongate flow path 44 formed by a duct 184. Typically, the duct 184 is formed in part by a mounting body (46—FIG. 1) to which the plate 182 and other components are secured, and separate duct members are connected to the mounting body. The valve plate 182 is supported in the flow path 44 by support shafts (as at 186) which are formed as cylindrical bosses on the valve plate and which extend into slots (as at 188) formed in the duct 184. Alternatively, a single support shaft secured to the valve plate 182 may be used. The support shafts 186 incorporate roller bearings (as at 190) on their ends as indicated so that the valve plate 182 is freely rotatable over a range of rotational positions extending from a closed position (FIG. 14--the closed position being the position at which, in a given application, flow is maximally obstructed, whether or not completely obstructed via sealing contact) to a fully open position (FIG. 18—the fully open position being the position at which, in a given application, flow is minimally obstructed, whether or not the valve plate is parallel to the longitudinal direction of the flow path). The slots 188 are appropriately shaped and dimensioned to permit linear movement of the support shafts 186 in the longitudinal direction 192 of the flow path 44, while substantially preventing movement in directions transverse to both the support shafts and the foresaid longitudinal direction. The longitudinal axis 194 (FIG. 15) of the support shafts 186 defines the axis of rotation for the valve plate 182, and is centered in the flow path 44. A pivot shaft 196 incorporating roller bearings 198, 200 extends across the flow path 44 and through two arcuate slots (as at 202, FIG. 15) formed in opposing sides of the duct 184. The ends of the pivot shaft 196 are pressed into rotationally aligned gearplates 204, 206 so that the shaft is movable with the gearplates. The gearplates 204, 206 are rotatable about axially-aligned shafts 208, 210 which are rigidly secured to the duct 184 and journalled in the gearplates. Each of the gearplates 204, 206 has an arcuate rack gear (as at 212 in FIG. 16) formed in an arcuate edge of the plate. The rack gears 212 engage pinion gears 214, 216 that are rigidly secured to a control shaft 218. The control shaft 218 is journalled in the duct 184 and extends across the flow path 44. At least one end of the control shaft 218 projects from the valve 180 so that the shaft can receive torque applied thereto by an externally-disposed actuator 36. The duct 184 preferably includes cover plates 220, 222 to form a sealed enclosure permitting leakage of fluid through the arcuate slots 202, and easy access to the rack and pinion gears 212, 214, 216.

Figure 15:
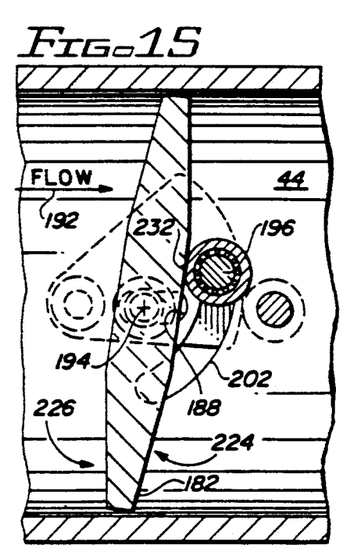
FIG. 15 is a cross-sectional view taken along line 15—15 of FIG. 14 with the valve plate near its closed rotational position.
Figure 16:
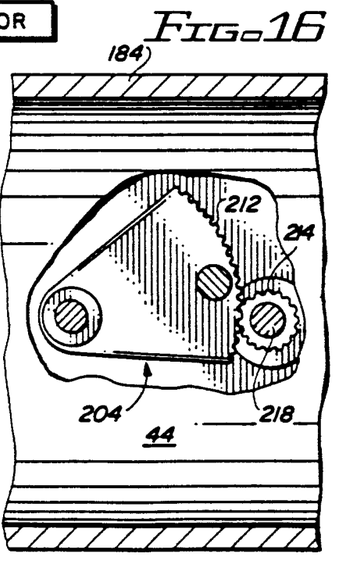
FIG. 16 is a partially fragmentary cross-sectional view taken along line 16—16 of FIG. 14 and illustrates in elevation certain power transmission components for use in controlling the position of the pivot shaft.
Figure 17:
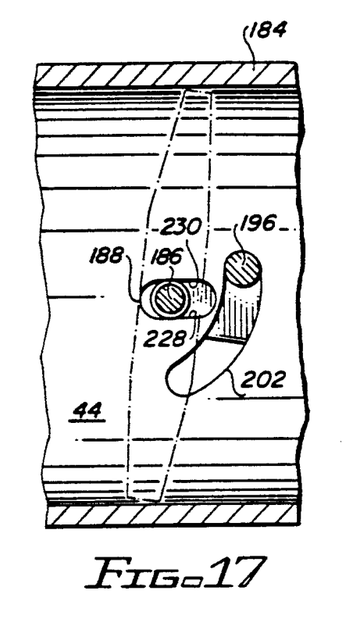
FIG. 17 is a cross-sectional view taken along line 17—17 of FIG. 14 and illustrates slots adapted to permit movement of the valve plate and pivot shaft.

In use, the roller bearings 198, 200 abut the downstream-facing surface 224 (FIG. 15) of the valve plate 182 and the pivot shaft 196 bears the pressure exerted by high-pressure fluid on the upstream-facing surface 226 (FIG. 15) of the valve plate 182, except when the valve plate 182 nears the closed rotational position. While the support shafts 186 and valve plate 182 are substantially immovable in directions transverse to both the support shafts and the indicated longitudinal direction 192, a very small clearance sufficient to permit rolling movement of the roller bearings 190 in the slots 188 is provided. When the valve plate 182 is near the closed position (as indicated in FIG. 15, for example) and subjected to gravitational force, the support shafts 186 bear against the lower surface 228 (FIG. 17) of the slots 188. However, when the pivot shaft 196 is sufficiently low (as determined by reference to FIGS. 15, 17, 18, and 20) in the arcuate slots 202, the high-pressure fluid upstream from the valve plate 182 forces the latter very slightly upward so that the support shafts 186 bear against the upper surface 230 (FIG. 17) of the slots 188. Accordingly, the support shafts 186 function as a pivot shaft over a small range of rotational positions near the closed position, whereas the pivot shaft 196 performs that function over a substantial range of open rotational positions of the valve plate 182 in order to effect fluid-dynamic-torque adjustment. Use of the pivot shaft 196 as such requires that the support shafts 186 not be similarly operative in the forementioned range of rotational positions. On the other hand, the support shaft 186 is needed to ensure that the axis of rotation 194 remains centered in the flow path 44. In order to meet these requirements, movement of the valve plate 182 and support shafts 186 in the longitudinal direction 192 is provided for via the slots 188. Translational movement of the pivot shaft 196 relative to the valve plate 182 follows from rotational movement of the control shaft 218 via the gearplates 204, 206 and pinion gears 214, 216.

The valve plate 182 and pivot shaft 196 cooperate to define the pivot axis therebetween. The pivot axis is indicated by the numeral 232 and can be viewed in FIG. 15 as extending into and out from the drawing. The pivot axis 232 geometrically bisects the downstream-facing surface 224 into two areas which change with translational movement of the pivot shaft 196. When fluid is conveyed along the flow path 44 with the valve plate 182 in an open position, and when the pivot axis 232 is misaligned with the center of pressure exerted by the fluid on the valve plate, the fluid exerts a net torque on the plate about the pivot axis. To stabilize the valve plate 182 at an open rotational position, the pivot shaft 196 is moved so that the pivot axis 232 is as closely aligned with the center of pressure as possible. To move the valve plate 182 to a different rotational position, the pivot shaft 196 is moved to purposely misalign the center of pressure with the pivot axis 232 so that the high-pressure fluid rotates the valve plate in the desired direction. To effect initial opening, the pivot shaft 196 is moved downward past the center of pressure so that the valve plate moves rotationally away from the closed position in response to substitution of the pivot shaft 196 for the support shafts 186 as the operative pivot element, and to the consequent change in the position of the pivot axis 232 relative to the center of pressure.

Typically, the duct 184 is adapted to provide a mechanical stop (not shown) that prevents rotational movement of the valve plate 182 past the closed position in a direction viewed as counterclockwise in FIG. 15. In applications requiring complete obstruction of flow at the closed position, a circumferential rim seal is provided around the valve plate 182.

It should be understood that although the illustrated values 40, 180 have circular flow path/circular valve plate configurations, the invention is equally applicable to other configurations including that of a rectangular flow path/rectangular valve plate, and that the term "butterfly valve" as used herein is intended to include such other configurations to the extent that the teaching provided herein can be beneficially employed.

Figure 21:
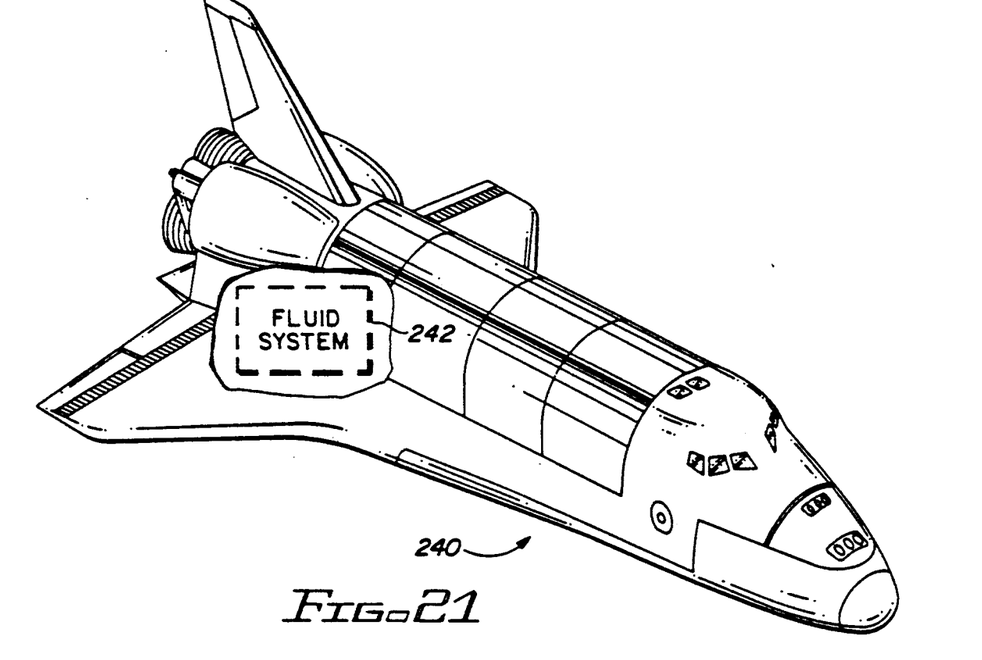
FIG. 21 is a partially perspective and partially schematic drawing depicting a fluid system installed aboard a flight craft.

FIG. 21 illustrates a flight craft 240 aboard which a fluid system 242 is installed. The flight craft 240 may be a vehicle adapted for atmospheric flight, for space flight, or for both. Accordingly, the fluid system 242 may be one of the following, though it is not necessarily limited thereto: a bleed-air system, an environmental control system, a turbine starter system, a cabin pressurization system, an anti-ice system, or a subsystem of any of the above.

Figure 22:
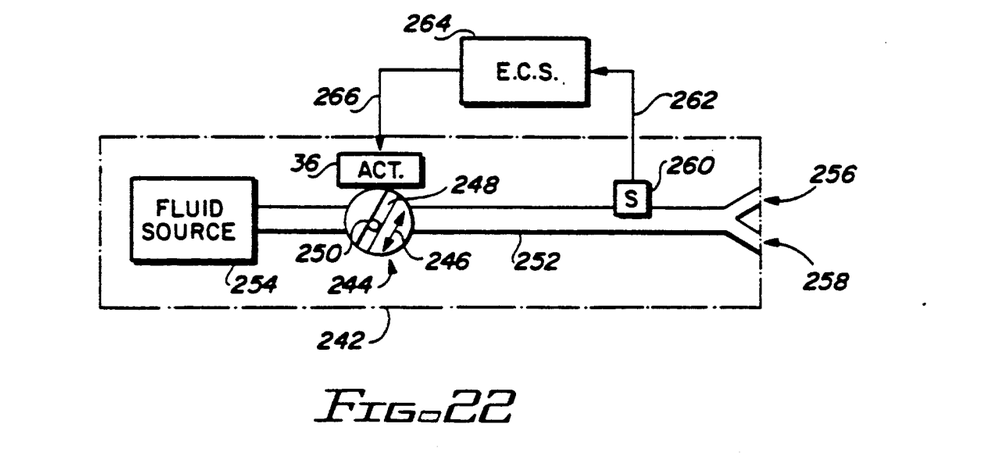
FIG. 22 is a schematic illustration of the fluid system depicted in FIG. 21.

In FIG. 22, the fluid system 242 includes at least on butterfly valve 244 adapted to provide for relative translational movement (represented at 246) between the valve plate 248 and the pivot mechanism 250. The valve plate 248 is disposed in an elongate flow path formed by a supply duct 252 extending from a source 254 of pressurized fluid to one or more locations (represented by arrows 256, 258) of use for the fluid. The system 242 may further include a return duct (not shown) in specific applications. Exemplary sources of the fluid include turbofans, axial or centrifugal compressors, axial or centrifugal turbines, and pressurized tanks generally. A sensor 260 is suitably connected to the duct 252 to access the flow path at a location downstream from the valve 244. The sensor 260 may be any of a variety of devices suitable for use in measuring one or more physical characteristics (e.g. flow rate, pressure, temperature) of the fluid which are of interest in a specific application. The sensor 260 may be a capacitance-based or piezoelectric-based pressure transducer, an electrofluidic flow meter, a strain gauge, or a hot wire anemometer, for example. An actuator 36 is operably connected to the valve 244 to control the position of the valve plate 248 in response to control signals (represented by line 266) received from an electronic control system ("ECS") 264, which in turn responds to sensory data input signals (represented by line 262) received from the sensor 260. Typically, a shaft position encoder (not shown) or functionally equivalent device is provided to supply the ECS 264 with information indicating the rotational position of the valve plate 248. The actuator 36 may be any of a variety of suitable electromechanical devices such as DC motors, torque motors, stepper motors, or hydraulic or pneumatic motors in combination with solenoids, for example.

The reader should understand that the foregoing portion of the description, which description includes the accompanying drawings, is not intended to restrict the scope of the invention to the illustrated embodiments thereof or to specific details which are ancillary to the teaching contained herein. The invention should be construed in the broadest manner which is consistent with the following claims and their equivalents.

What is claimed is:

1. A fluid system installed aboard a flight craft, the fluid system comprising a source of pressurized fluid, a duct forming a flow path extending from the source to a location of use aboard the craft, and a butterfly valve having a rotatable valve member interposed in the flow path between the source and the location of use, the valve member being secured to the duct so as to be rotatable in the flow path over a range of rotational positions that variably permits fluid flow from the source through the valve and to the location of use, the valve defining a pivot axis for the valve member and being adapted to provide for relative translational movement between the valve member and the pivot axis whereby torque applied by the fluid on the valve member and about the pivot axis is alterable at each of a multiplicity of the rotational positions in response to the translational movement.

2. The invention of claim 1 further comprising an actuator operably connected to the valve to position the valve member.

3. The invention of claim 2 wherein the actuator comprises an electric motor.

4. The invention of claim 2 further comprising a sensor adapted to respond to a change in a physical characteristic of the fluid, the sensor being operably connected to the duct so as to access the flow path at a location between the valve and the location of use.

5. A butterfly valve comprising a mounting body defining a flow path, and a valve plate supported by the mounting body and rotationally positionable in the flow path to alter flow through the valve, the valve defining a pivot axis about which the valve plate is pivotable and being structurally adapted to provide for relative translational movement between the rotationally positionable valve plate and the pivot axis whereby the valve is operable in use and at a multiplicity of rotational positions of the valve plate to controllably alter fluid dynamic torque exerted on the valve plate and about the pivot axis.

6. A method for facilitating control of a butterfly valve through which a fluid is being conveyed, wherein the valve comprises a valve plate which is rotationally positionable in a flow path to modulate flow of the fluid, and a pivot mechanism cooperating with the valve plate to define a pivot axis that geometrically divides a surface of the plate into two areas, the valve plate being pivotable about the axis so that the fluid exerts a net torque on the valve plate, the method comprising the step of:

a controllably altering the net torque when the valve plate is at a rotational position permitting fluid flow through the valve by effecting relative translational movement between the valve plate and the pivot mechanism in a direction which effects an increase in one of the two areas and a decrease in the other.

7. A method as recited in claim 6 wherein the step is repeated at a plurality of different rotational positions of the valve plate.

8. A butterfly valve having a valve plate which is selectively positionable within a range of rotational positions at which flow is permitted through the valve;

the valve defining at each of the rotational positions in the range of pivot axis about which the valve plate is pivotable and which geometrically divides a surface of the valve plate into two areas;

the valve being structurally adapted to provide for relative translational movement between the valve plate and the pivot axis at each of the rotational positions in the range, whereby the movement effects a decrease in one of the two areas and a corresponding increase in the other area;

and further comprising in combination with the valve kinematic means for effecting the translational movement in response to external actuation.

9. A butterfly valve comprising a mounting body forming a segment of a flow path extending therethrough, and a valve plate disposed in the segment and selectively positionable therein over a substantial range of rotational positions at which flow is permitted through the valve, the valve defining at each of the rotational positions in the range a pivot axis about which the valve plate is pivotable and which geometrically divides a surface of the valve plate into two areas, the valve being structurally adapted to provide for relative translational movement between the valve plate and the pivot axis at each of the rotational positions such that the movement effects a decrease in one of the two areas and a corresponding increase in the other area, whereby the valve is operable in use and at all rotational positions in the range to controllably alter fluid dynamic torque exerted on the valve plate and about the pivot axis.

10. The invention of claim 9 wherein the valve plate is translationally movable at each of the rotational positions in the range, whereby the relative translational movement depends on movement of the valve plate relative to the mounting body and is independent on movement of the pivot axis relative to the mounting body.

11. The invention of claim 9 wherein the pivot axis is translationally movable at each of the rotational positions in the range, whereby the relative translational movement depends on movement of the pivot axis relative to the mounting body and is independent on movement of the valve plate relative to the mounting body.

12. The invention of claim 9 further comprising in combination therewith kinematic means for effecting the translational movement in response to external actuation.

13. The invention of claim 12 wherein the kinematic means comprises a shaft which cooperates with the valve plate to define the pivot axis.

14. The invention of claim 12 wherein the kinematic means comprises a shaft extending across the segment and having a longitudinal axis corresponding to the pivot axis.

* * * * *

UNITED STATES PATENT AND TRADEMARK OFFICE
CERTIFICATE OF CORRECTION

PATENT NO. : 5,067,506
DATED : November 26, 1991
INVENTOR(S) : BALL ET AL

It is certified that error appears in the above-identified patent and that said Letters Patent is hereby corrected as shown below:

Column 11,
In Claim 6, line 33, the word "a" should be deleted.

Col. 11,
In Claim 8, line 47, the word "of" should be replaced with the word --a--.

In column 1, line 6, --of the-- should appear between 'continuation-in-part' and 'following'.

In column 10, line 8, the word "on" should be replaced with the word --one--.

Signed and Sealed this

Ninth Day of March, 1993

*Attest:*

STEPHEN G. KUNIN

*Attesting Officer*      *Acting Commissioner of Patents and Trademarks*